US007257523B1

(12) United States Patent
Nixon et al.

(10) Patent No.: US 7,257,523 B1
(45) Date of Patent: Aug. 14, 2007

(54) INTEGRATED DISTRIBUTED PROCESS CONTROL SYSTEM FUNCTIONALITY ON A SINGLE COMPUTER

(75) Inventors: Mark Nixon, Round Rock, TX (US); Terrence L. Blevins, Round Rock, TX (US); Wilhelm K. Wojsznis, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 447 days.

(21) Appl. No.: 09/510,053

(22) Filed: Feb. 22, 2000

Related U.S. Application Data

(60) Provisional application No. 60/132,780, filed on May 6, 1999.

(51) Int. Cl.
*G06F 17/50* (2006.01)
(52) U.S. Cl. ............................. 703/13; 703/16; 700/2; 700/79
(58) Field of Classification Search .................. 703/21, 703/25, 3, 6, 16, 13; 345/763, 764, 762, 345/771; 700/29, 87, 79, 37, 44, 45, 83, 700/98, 121, 2; 73/168; 370/438
See application file for complete search history.

(56) References Cited

U.S. PATENT DOCUMENTS 4,506,324 A   3/1985   Healy .......................... 364/200

(Continued)

FOREIGN PATENT DOCUMENTS

GB         2 328 523 A    2/1999

(Continued)

OTHER PUBLICATIONS

Cavalieri et al., "Impact of fieldbs on communication in robotic systems", IEEE Transactions on Robotics and automation, Feb. 1997.*

(Continued)

*Primary Examiner*—Paul Rodriguez
*Assistant Examiner*—Kandasamy Thangavelu
(74) *Attorney, Agent, or Firm*—Marshall, Gerstein & Borun LLP

(57) ABSTRACT

An apparatus is adapted to be used to create software and programming instructions for a distributed process control system having a user workstation remotely located from a distributed controller that controls one or more field devices using control modules. The apparatus includes a computer having a memory and a processing unit as well as a configuration application and a controller application stored on the computer memory to be executed on the processor. The configuration application is further capable of being executed on the user workstation of the distributed process control system to create the control modules for execution by the distributed controller while the controller application is adapted to be executed on the distributed controller to implement one of the control modules during operation of the distributed process control system. In this system, the configuration application, when run on the computer, creates a first control module capable of being used by the distributed controller within the distributed process control system and the controller application causes execution of the first control module within the computer to thereby simulate operation of the distributed process control system. The use of this system enables the simulation and testing of distributed process control system software and control modules without the use of the hardware, e.g., the distributed process controller and field devices, which will ultimately run that software.

21 Claims, 2 Drawing Sheets

U.S. PATENT DOCUMENTS

| | | | |
|---|---|---|---|
| 4,663,704 A | 5/1987 | Jones et al. | 364/188 |
| 4,977,529 A | 12/1990 | Gregg et al. | 364/578 |
| 5,021,947 A | 6/1991 | Campbell et al. | 364/200 |
| 5,041,964 A | 8/1991 | Cole et al. | 364/200 |
| 5,079,731 A | 1/1992 | Miller et al. | 364/578 |
| 5,097,412 A | 3/1992 | Orimo et al. | 395/500 |
| 5,119,468 A | 6/1992 | Owens | 395/22 |
| 5,218,709 A | 6/1993 | Fijany et al. | 395/800 |
| 5,428,555 A | 6/1995 | Starkey et al. | 364/551.01 |
| 5,752,008 A | 5/1998 | Bowling | 395/500 |
| 5,818,736 A * | 10/1998 | Leibold | 703/16 |
| 5,992,229 A * | 11/1999 | Pyotsia et al. | 73/168 |
| 6,044,305 A * | 3/2000 | Larson et al. | 700/87 |
| 6,104,722 A * | 8/2000 | Stewart | 370/438 |
| 6,192,281 B1 * | 2/2001 | Brown et al. | 700/2 |
| 6,377,859 B1 * | 4/2002 | Brown et al. | 700/79 |
| 6,385,496 B1 * | 5/2002 | Irwin et al. | 700/87 |
| 6,411,923 B1 * | 6/2002 | Stewart et al. | 703/25 |

FOREIGN PATENT DOCUMENTS

| | | |
|---|---|---|
| JP | HEI 07-248941 | 9/1995 |
| JP | HEI 08-314760 | 11/1996 |
| WO | WO97/38362 | 10/1997 |
| WO | WO97/45778 | 12/1997 |

OTHER PUBLICATIONS

Great Britain Search Report Under Section 17 dated Sep. 5, 2000 issued in United Kingdom Application GB 0010850.6.

Notice of Reason for Rejection, Issued in Corresponding Japanese Patent Application Serial No. 2000-134873, dated Feb. 3, 2004..

\* cited by examiner though the use of these systems demonstrates the usefulness of these systems, the amount of configuration required to set up the system is significant.

INTEGRATED DISTRIBUTED PROCESS CONTROL SYSTEM FUNCTIONALITY ON A SINGLE COMPUTER

RELATED APPLICATION

This is a regular filed application based on provisional application Ser. No. 60/132,780, filed May 6, 1999 entitled "Integrating Distributed Process Control System Functionality on a Single Computer."

FIELD OF THE INVENTION

The present invention relates generally to process control systems and, more particularly, to a system that integrates process control functionality associated with a distributed process control system on a single computer.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions typically implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc. typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, simulating the operation of the process for the purpose of training personnel or testing the process control software, keeping and updating a configuration database, etc.

For example, the DeltaV™ control system, sold by Fisher-Rosemount Systems, Inc. includes multiple applications stored within and executed by different devices located at diverse places within a process. A configuration application, which resides in one or more operator workstations, enables users to create or change process control modules and download these process control modules via a data highway to a dedicated distributed controller. The configuration application may also allow a designer to create or change user interfaces which are used by a viewing application to display data to a user and to enable a user to change settings, such as set points, within the process control routine. A dedicated controller and, in some cases, field devices, store and execute a controller application that runs the control modules assigned and downloaded thereto to implement actual process control. Viewing applications, which may be run on one or more operator workstations, receive data from the controller application via the data highway and display this data to process control system designers, operators, or users using the user interfaces, which may provide any of a number of different views, such as an operator's view, an engineer's view, a technician's view, etc. A data historian application is typically stored in and executed by a data historian device that collects and stores some or all of the data provided across the data highway while a configuration database application may run in a still further computer device attached to the data highway to store the current process control routine configuration and data associated therewith. Alternatively, the configuration database is stored in the same workstation as the configuration application.

Simulation applications, such as the Mimic application sold by Don H. Munger Company in St. Louis, Mo., or the HYSYS application manufactured and sold by Hyprotech in Calgary Canada may be run on a personal computer attached to the data highway. These or other interface applications communicate with the controller application and the viewing application via the data highway to enable testing of the control modules stored in the controller or the user interfaces used by the viewing applications run in the workstations. These simulation applications also enable training and system checkout to be performed. In some cases, the HYSYS application, which is a high fidelity process simulation product, has been integrated into the same computer as the Mimic application to simulate the exact timing and response of a process control design for the checkout of that design. Typically, these simulation applications communicate with the controller applications within the controller or the field devices using a standard interface, such as the OPC interface or the PI interface, which are well-known. Alternatively, simulation has been performed manually, wherein an operator or other user takes advantage of the simulate capabilities of input/output (I/O) function blocks within the control modules of the controller or the field devices to manually set the value and status variables processed by the I/O blocks to, in turn, enable display information logic or control logic to be verified without actually controlling a field device or even having a field device connected to the controller. In either case, specific simulation modules may be created and stored in the controller or the field devices to interact with the actual control modules by providing simulated process dynamics based on an output block target to the actual control modules.

In these systems, it is possible to verify that the information shown in the user displays produced by the viewing applications is being correctly communicated by the controller after designing, assigning and downloading the control modules to the controller or the field devices and using a simulation procedure to test the system. The advantage of using the complete system hardware for configuration checkout and operator training is that the physical connections to the controller and communications between the controller and workstation may be fully tested. Also, the performance, memory requirements, and loads introduced into the controller by configured modules may be examined. Unfortunately, however, a hardware controller and/or smart field devices must be present, i.e., connected to the system, in all cases to enable checkout of the control logic or the viewing logic because the controller application and process control modules are created for execution within and are stored within the controller or a field device connected to the controller.

In many cases, however, equipment for a distributed process control system may not be purchased until after the plant and control designs are complete, which prevents or delays testing of the control modules within the controller and field devices and the user interfaces within the user workstations. Furthermore, after the equipment is purchased, it is often tied up in the actual installation and thus, is not normally available for configuration checkout or training purposes. As a result, it is often necessary to purchase additional system hardware just to support plant design, configuration checkout, and operator training. While, in some cases, the cost of this additional hardware may be budgeted as spare parts, in many cases, the cost of this additional hardware cannot be justified by a plant to support operator training, plant design and configuration checkout.

Some process control systems reduce the amount of hardware required by designing the system so that the process control application runs in the same workstation as other software, such as the viewing application and the configuration database application. However, these systems are no longer truly distributed process control systems because the process control software is located at an operator or engineer station away from the process environment, generally requiring process control communications to occur over longer distances and the running of many more or longer communication lines between the workstation and the I/O and field devices within the process environment. Furthermore, such a combined system does not provide for simulation of the process control software within the workstation for testing purposes and then downloading the process control software to a different dedicated controller or field device for execution during runtime.

SUMMARY OF THE INVENTION

The present invention is directed to the integration of distributed process control system functionality on a single computer, such as a single personal computer or laptop computer, to enable ease in developing and testing of the distributed process control system software and to enable simulation of the distributed process control system using that software.

In one embodiment, an apparatus adapted to be used with a distributed process control system having a user workstation remotely located from a distributed controller that controls one or more field devices using control modules includes a computer having a memory and a processing unit. A configuration application is stored in the memory of the computer and is adapted to be executed on the processing unit of the computer, with the configuration application also being capable of being executed on the user workstation to create the control modules for execution by the distributed controller. Moreover, a controller application is stored in the memory of the computer and is adapted to be executed on the processing unit of the computer, with the controller application being further adapted to be executed on the distributed controller to implement one of the control modules during operation of the process control system. In this system, the configuration application is further adapted to create a first control module capable of being used by the distributed controller within the process control system when the configuration application is executed on the computer and the controller application is adapted to cause execution of the first control module within the computer to thereby simulate operation of the distributed process control system. The use of this system enables the simulation and testing of distributed process control system software and control modules without the use of the dedicated hardware, e.g., the distributed process controller and field devices, which will ultimately run that software.

In another embodiment, an apparatus adapted to be used in conjunction with a distributed process control system having a user workstation remotely located from a distributed controller that controls one or more field devices using control modules includes a computer having a memory and a processing unit and a display connected to the processing unit. A controller application is stored in the memory of the computer and is adapted to be executed on the processing unit of the computer. This controller application is also adapted to be executed on the distributed controller to implement a control module during operation of the process control system and is capable of communicating with a further controller that is of a different type than the distributed controller of the distributed process control system. A viewing application is stored in the memory of the computer and is adapted to be executed on the processing unit of the computer. This viewing application is also adapted to communicate with the controller application within the computer and to use the display to display to a user, information sent from the further controller.

DESCRIPTION OF THE PREFERRED EMBODIMENTS

Figure 1:
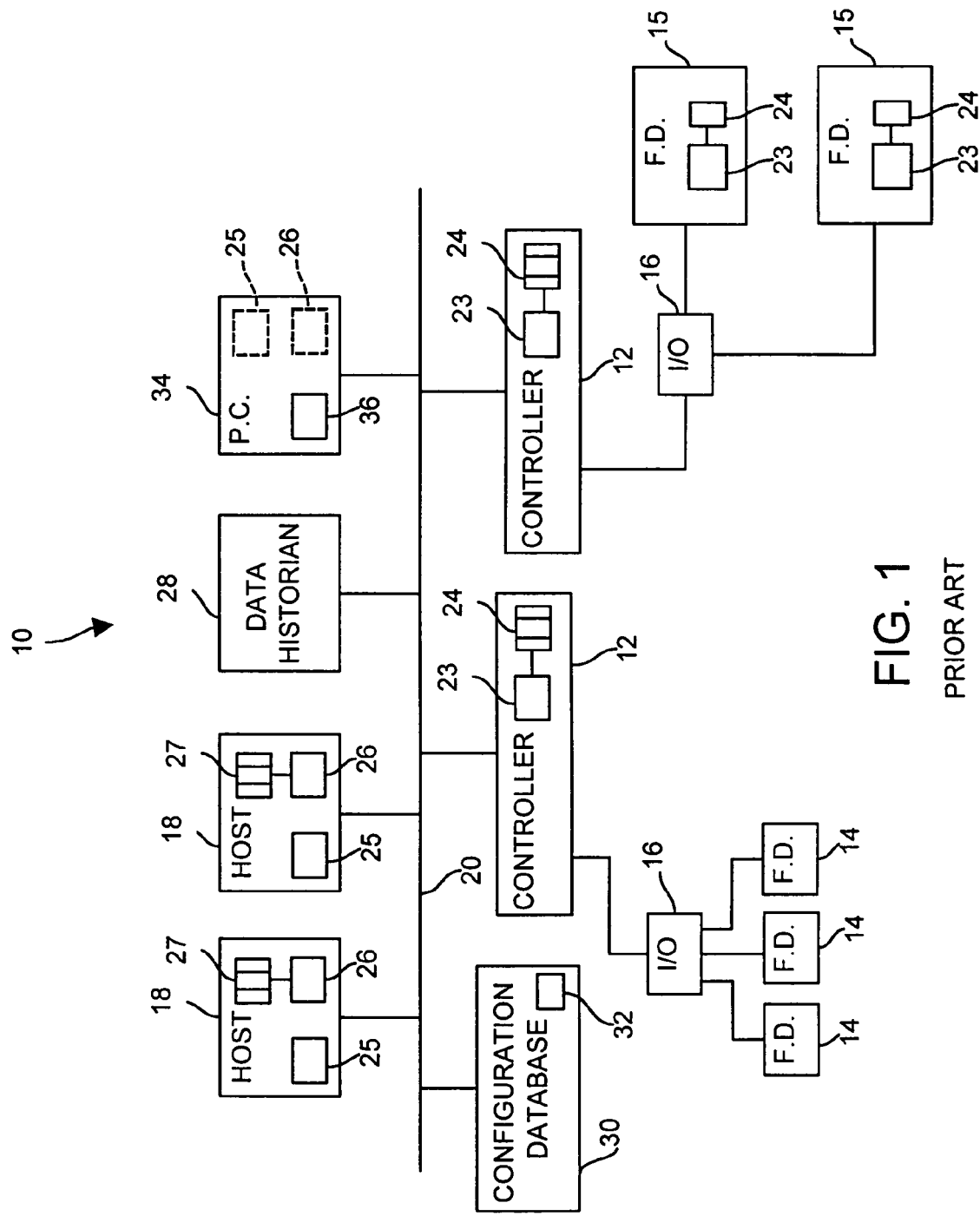
FIG. 1 is a block diagram of a typical process control network having different process control functions performed by different hardware devices.

Referring now to FIG. 1, a typical known distributed process control system 10 includes one or more dedicated process controllers 12 each connected to one or more field devices 14 and 15 via input/output (I/O) modules 16 which may be, for example, Fieldbus interfaces. The controllers 12 are also coupled to one or more host or operator workstations 18 via a data highway 20 which may be, for example, an Ethernet link. While the controllers 12, I/O modules 16 and field devices 14 and 15 are located down within and distributed throughout the harsh plant environment, the operator workstations 18 are usually located in control rooms or other less harsh environments easily assessable by controller personnel. Each of the controllers 12, which may be by way of example, the DeltaV controller sold by Fisher-Rosemount Systems, Inc., stores and executes a controller application 23 that implements a control strategy using a number of different, independently executed, control modules 24. The control modules 24 may each be made up of what are commonly referred to as function blocks wherein each function block is a part or a subroutine of an overall control routine and operates in conjunction with other function blocks (via communications called links) to implement process control loops within the process control system 10. As is well known, function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. However, the control modules 24 could be designed using any desired control programming scheme including, for example, sequential function block, ladder logic, etc. and are not limited to being designed using function block or any other particular programming technique.

In the system illustrated in FIG. 1, the field devices 15 connected to one of the controllers 12 are smart field devices, such as Fieldbus field devices, which include a processor and a memory. These devices store and execute the controller application 23 as well as modules 24, or sub-parts, such as function blocks, of one or more of the modules 24. The modules or parts of modules within the field devices 15 may be executed in conjunction with the execution of the modules within the controller 12 to implement process control as is known.

The host workstation 18 stores and executes a configuration application 25 that is used to create or change the process control modules 24 and to download these control modules via the data highway 20 to one of the controllers 12 and/or to field devices such as one of the field devices 15. The host workstation 18 may also store and execute a viewing application 26 that receives data from the controller 12 via the data highway 20 and that displays this information via a display mechanism using predefined user interfaces 27 or views, typically created using the configuration application 25. In some cases, the viewing application 26 receives inputs, such as set point changes, from the user and provides these inputs to the controller application 23 within one or more of the controllers 12.

A data historian 28 is connected to the data highway 20 and stores data in a memory therein using any desired or known data historian software. However, the data historian could alternatively be in one or more of the workstations 18 if so desired. Furthermore, a configuration database 30 runs a configuration database application 32 that stores the current configuration of the process control system and data associated therewith.

A personal computer (PC) 34 may be connected to the data highway 20 and execute other applications, such as training, testing and simulation applications 36. Such applications typically interact with and receive data from the controllers 12 and the configuration database 30 related to the operation or set-up of the process control system. As indicated above, the process control modules 24 within the controller 12 and the field devices 15 may be set in a simulation mode or state to provide predetermined or operator provided values back to the simulation software 36 to enable testing of the control modules 24 used by the controller applications 23 and the user interfaces 27 used by the viewing application 26. In some cases, one or both of the viewing application 26 and the configuration application 25 are stored in and executed by the PC 34 to enable changes to be made to the process control modules 24 and/or to the user interfaces 27. However, it will be understood that, with the system of FIG. 1, the controller application 23 and the process control modules 24 are loaded into and executed by the dedicated controller 12 and/or the field devices 15 before the simulation application 36 can be used to test these components.

Figure 2:
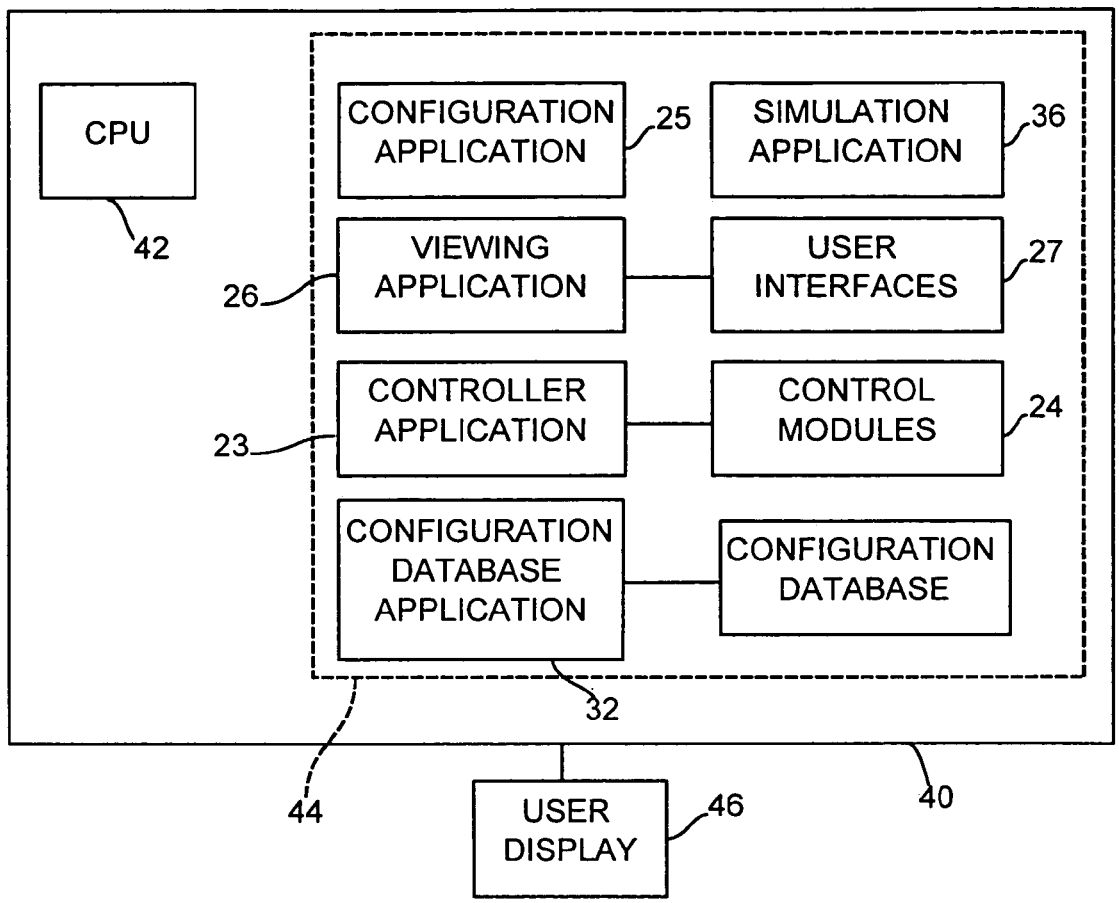
FIG. 2 is a block diagram of a single computer that executes different distributed process control applications for the purpose configuration design, system checkout and simulation of process control activity in a distributed process control environment like that of FIG. 1.

Referring now to FIG. 2, a single computer 40 having a CPU 42, a memory 44 and a user display 46 stores and executes, in a coordinated manner, the distributed process control system software associated with the various different hardware of the control system of FIG. 1 and may be used to perform, for example, simulation of the process control system for training, design and testing purposes. While the computer 40 may be connected to the data highway 20 of the system of FIG. 1, it can also operate as a stand-alone unit to provide, for example, simulation of the software components used in the system of FIG. 1. The computer 40 may be any type of computer, including a personal computer, a laptop computer, a workstation, etc. having any type of display device, memories, CPU(s), etc. associated therewith and, therefore is typically cheaper and more available than the dedicated hardware components illustrated in FIG. 1.

In the embodiment of FIG. 2, the computer 40 stores the configuration application 25, the viewing application 26 and, if desired, one or both of the simulation application 36 and the database configuration application 32 in the memory 44 and executes these applications as needed on the CPU 42. Importantly, the computer 40 also stores the controller application 23 for execution. In this case, the configuration application 25 can be used to design and create one or more process control modules 24 (to be eventually downloaded to a controller and/or field devices for use in controlling a process), as well as to create user interfaces 27 (to be eventually used in an operator workstation 18 by a viewing application 26). However, before assigning and downloading any of the process control modules 24 to a controller or to field device or before assigning and downloading the user interfaces 27 to a workstation, these components are stored in or assigned to the computer 40 for testing or simulation purposes.

After creating or otherwise receiving the control modules 24 and/or the user interfaces 27, the CPU 42 executes the controller application 23 and the associated control modules 24, executes the viewing application 26 and the associated user interfaces 27, and may execute the database configuration application 32 to, for example, simulate the operation of these components. Of course, the viewing application 26 and the database configuration application 32, if being used, are executed in conjunction with the controller application 23 on the CPU 42 in any desired coordinated manner, such as using a windows-type operating system or using any desired or standard time sharing protocol, such as those associated with object oriented programming techniques.

Because the controller application is now being executed in the computer 40, instead of a dedicated controller 12 having I/O modules attached thereto, the input and output blocks of the control modules 24 must be set to simulate operation of attached devices, such as field devices or input/output modules. This can be accomplished in the same manner as simulation was performed in the system of FIG. 1, wherein a user relied on the simulation capabilities already provided by or within the control modules 24 to set the input and output parameters thereof. For example, in the DeltaV controller system, a user may manually set the simulate parameters of the input/output function blocks in process control modules 24 designed for a controller or a field device or may provide specific simulation process control modules which interface with the input/output blocks of the control modules 24 within the computer 40 to respond to outputs produced by these control modules and to generate inputs for the control modules 24. Alternatively, or in conjunction, a simulation application 32 may be run in the computer 40 to interact with the control modules 24 to thereby simulate actual process functions. In this case, access parameters, such as input/output simulation parameters within the process control modules 24 or the user interfaces 27 may be supported through use of the well-known OPC interface, making it is possible to execute and check out applications that normally run in the workstation 18 (such as the viewing application 26), the configurations database 30, the controller 12 (such as the controller application 23) or the field devices using an OPC interface. For example, an OPC interface may be developed to communicate between simulation software such as the HYSYS product and the controller application, such as the DeltaV controller application. Of course, other interfaces and simulation applications could be used as well. Furthermore, by installing the controller application 23 on the computer 40, the debug tools provided by, for example, C++ or other programming environments, may be used to trouble shoot any of the software on the computer 40, such as the control modules 24 or the user interfaces 27.

As will be understood, the controller application 23 (and the process control modules 24 thereof) now communicate with the viewing application 26, the simulation application 36, the database configuration application 32 and any other desired applications, such as advanced process control and diagnostic applications, within the computer 40, and not via an external data highway such as that of FIG. 1.

Using the integrated system of FIG. 2, the different applications and modules stored and executed within different hardware devices in a distributed process control system may be implemented in a single, stand-alone computer to enable configuration or testing of, for example, the process control modules 24, the user interfaces 27, or to enable training of a user or operator in a simulation environment without the need for dedicated hardware, such a controller 12, a field device 15 or the configuration database 30. In this manner, design, testing and training associated with these components can be performed before any dedicated distributed process control system hardware is purchased or becomes available. Furthermore, the process control modules 24 and the user interfaces 26, once tested, can be assigned and downloaded to a controller, a field device (such as a Fieldbus field device) or a different workstation to be used during the runtime of an actual distributed process system without further modification because, in the preferred embodiment, these components are designed to run on an open operating system having a communication interface that enables these components to be run on any device and to communicate with components on different devices. Thus, these software components are not limited to being run on a particular piece of dedicated hardware, such as the controller 12 or a field device 15. This is particularly true in the case of the DeltaV controller software which was initially designed to run on any open platform and to provide communications to other software components in other hardware devices, and is not limited to running or being executed on specific hardware associated with a specific vendor.

One benefit of the above-described approach of integrating the process control software with the viewing software and the simulation software on a single PC or other computer is the dramatic reduction in the hardware required for configuration development, controller and operator interface checkout, and operator training. In particular, the process control modules 24 being developed for a distributed control system may be assigned to the computer 40 and executed as though they were in a dedicated controller or a field device without the actual controller being present. In fact, using the simulation capability of input/output function blocks, the process control modules 24 may be created, stored and executed within the computer 40 to simulate a process and to thereby enable control system checkout and operator training before any dedicated hardware is purchased or installed.

Because the controller application 23 is executed by the computer 40 and is not connected to or controlling actual field devices in a process, the controller application 23 can be set or configured to enable the process control modules 24 to be executed at speeds other than the real-time speed at which these modules are to be executed in a dedicated controller 12 or one of the field devices 15 during runtime. For example, in the DeltaV system, each of the control modules 24 includes a parameter defining the execution rate of that module during runtime, i.e., how often the control module is to be executed in a definite time period. When run in the computer 40, however, the controller application 23 can be configured to execute the process control modules (or the function blocks thereof) faster or slower than the real-time rate because process control operations are only being simulated in the computer 40 and are not actually being performed.

Generally speaking, executing the process control modules faster than real-time is beneficial in training simulations and in some design applications. For example, in some complex processes, changes to set points and other operator controlled parameters may not cause a noticeable affect to the process for hours. In these cases, it is desirable to speed up the simulated response time to, for example, a minute or two, for both training and design purposes. Slowing down the execution speed of the process control modules 24 is desirable in, for example, some debugging procedures to enable the designer to see the inner workings of the modules at a slower rate. Likewise, some high fidelity simulation programs may take so much processing power (time) of the CPU 42 that it is impossible to run the process control modules 24 at the real-time speed, especially in conjunction with the controller application 23 and the viewing application 26. In these cases, it is desirable to reduce the execution speed of the control modules 24 to enable complete simulation.

Of course, the control application may enable a user to define or select the rate at which the control modules 24 are to be executed, or to define an execution speed multiplier, such as two times, five times, one-third, etc. to be used by the controller application in determining how fast to execute the blocks within the process control modules 24. It is preferable to have the capability of running control modules faster or slower than real-time automatically disabled when the controller application is executed by a dedicated controller 12 or a field device 15 to prevent using an incorrect execution speed during actual runtime of the process. Of course, other types of controller applications may define real-time execution speeds in other manners and, thus, changing the execution rate in the personal computer 40 may be performed using any other desired technique dictated by the specific configuration of the controller application.

Figure 3:
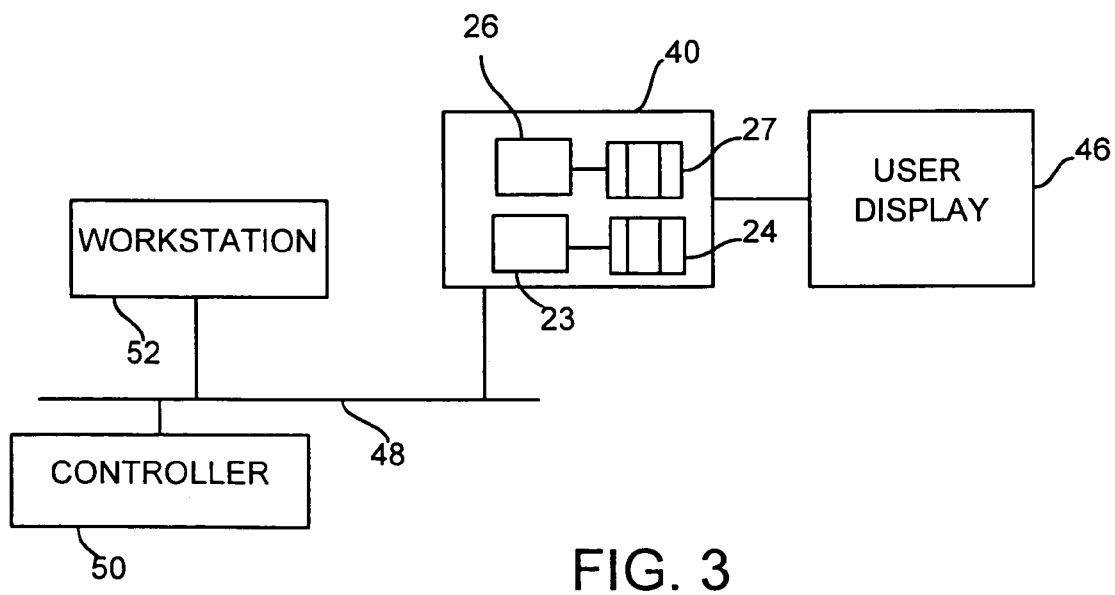
FIG. 3, is a block diagram of the computer of FIG. 2 communicatively coupled to a controller that executes a second controller application.

Still further, the controller application 23 stored in the computer 40 may be used to provide an advanced control platform that interfaces with other control platforms within known distributed control systems. Referring, for example, to FIG. 3, the computer 40 and, in particular, the controller application 23, may be connected via a communication line 48 (which may be a data highway) to a controller 50, which may be a different type of controller or may execute a different controller application, such as one provided by a different process controller manufacturer. As illustrated in FIG. 3, the controller 50 may be connected via the communication line 48 to a workstation 52 that runs applications for viewing data generated by the controller 50, changing the process control modules or other software within the controller 50 and other applications, all associated with the controller software executed by the controller 50. Likewise, the controller 50 may be connected to and control actual field devices (not shown) within a process.

The controller application 23 of FIG. 3 communicates with the controller 50 to obtain any desired data and, in some cases, to provide commands to change the operation of the controller 50. In this manner, advanced functionality of the controller, viewing, database configuration or other applications, such as diagnostic and trending applications, within the computer 40 may be used in conjunction with controller applications from other vendors.

To enable this advanced control, the controller application 23 may use an OPC interface specifically developed to interface between the configuration application 23 and the foreign system running on the controller 50. Alternatively, the configuration application 23 may utilize the capabilities of historical interface applications such as PI, which generally entails communicating through a data historian coupled to the controller 50, to thereby interface to foreign or different controller systems. Of course, any other desired interface may be used as well. In a preferred embodiment in which both the controller application 23 and the controller 50 support an OPC interface, the OPC Mirror shareware provided by Fisher-Rosemount Systems, Inc. may be used to tie the OPC servers together to thereby provide communication between the two OPC interfaces over, for example, the line 48.

In any case, specific control modules known as shadow function blocks can be provided within the process control modules 24 of the computer 40 and can be used to map control parameters or values between the protocol used by the application 23 and that used by the controller 50. Generally speaking, shadow function blocks are function blocks that operate within the protocol used by the controller application 23 to provide data to and to accept commands and data from other function blocks within that system. Instead of performing actual functions, the shadow function blocks mirror the state of and operate as an interface to external function blocks or other software elements within the process controller 50. More particularly, a shadow function block may use an OPC, PI or other interface to periodically communicate with the process controller 50 to obtain data or parameter values reflecting actual values within the process control system being controlled by the controller 50 and then store this data in a manner that is accessible by or available to other function blocks or process control modules within the controller application 23 via the protocol used by the controller application 23. The shadow function blocks also receive commands or data from other function blocks executed by the controller application 23 and provide these commands or data to an associated external function block or other software element within the process controller 50 using an OPC, PI or other interface. In this manner, shadow function blocks reflect the current state of a logical unit within the control system controlled by the controller 50 and send commands and other data generated by the controller application 23 within the computer 40 to the controller 50 to thereby modify that system. The details concerning the implementation of a shadow function block are not the subject of the present invention but are described in detail in U.S. patent application Ser. No. 09/151,084 entitled "A Shadow Function Block Interface For Use in a Process Control Network," filed Sep. 10, 1998, which is assigned to the assignee of the present invention, the disclosure of which is hereby expressly incorporated by reference herein.

In any event, once provided to the controller application 23 via the interface, data can be used by any of the process modules 24, by the viewing application 26 and the associated user interfaces 27, or by other applications, such as advanced applications associated with the controller application 23. These advanced applications may take any form, for example, model predictive control applications, neural network applications, and alarming, inspection and diagnostic applications like the diagnostic application described in U.S. patent application Ser. No. 09/256,585, entitled "Diagnostics in a Process Control System", filed Feb. 22, 1999, which is assigned to the assignee of the present invention and the disclosure of which is hereby expressly incorporated by reference herein. This ability to layer the standard software of a control system onto another control system for the implementation of advanced control and monitoring is a capability that is new to the process control industry.

When implemented, any of the software described herein may be stored in any computer readable memory such as on a magnetic disk, a laser disk, or other storage medium, in a RAM or ROM of a computer or processor, etc. Likewise, this software may be delivered to a user, a process control system or the computer 40 via any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or may be modulated using any suitable modulation carrier wave before being transmitted over a communication channel. Also, the terms workstation, computer, laptop, etc. are all used interchangeably herein to indicate any type of processing or computer device.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An apparatus for use with a distributed process control system having a user workstation remotely located from a distributed controller that controls one or more field devices using control modules, the apparatus comprising:

a computer having a memory and a processing unit;

a configuration application stored in the memory of the computer which, when executed on the user workstation or the computer, creates one or more control modules for execution by the distributed controller and a further module for execution by a device separated from the distributed controller, wherein at least one of the control modules is created to communicate with the further module within the device separated from the distributed controller to perform a control activity; and a controller application stored in the memory of the computer, which may be executed on the processing unit of the computer, wherein the controller application, when executed on the distributed controller, implements the one of the control modules during operation of the distributed process control system to communicate with the further module to perform the control activity;

wherein the configuration application, when executed on the computer, further creates the one of the control modules for use by the distributed controller within the distributed process control system and wherein the controller application when executed on the computer causes execution of the one of the control modules and the further module within the computer to simulate the operation of the one of the control modules including simulating communicating with the further module to thereby simulate operation of the distributed process control system.

2. The apparatus of claim 1, wherein the configuration application, when executed on the computer, creates a user interface for use in displaying information to a user, and further including a viewing application stored in the memory of the computer to be executed on the processing unit of the computer, wherein the viewing application, when executed on the computer, uses the user interface to display information pertaining to the one of the control modules to a user.

3. The apparatus of claim 1, further including a configuration database application stored in the memory of the computer to be executed on the processing unit of the computer, wherein the configuration database application, when executed on the computer, communicates with the controller application within the computer to manage a configuration database.

4. The apparatus of claim 1, wherein the controller application includes an execution rate parameter specifying the rate of execution of the one of the control modules within the computer.

5. The apparatus of claim 4, wherein the execution rate parameter can be set to be greater than or less than a real time execution rate of the one of the control modules when the one of the control modules is executed within the distributed controller of the distributed process control system.

6. The apparatus of claim 1, wherein the configuration application, when executed on the user workstation or the computer, creates a further control module for execution within the distributed controller during operation of the distributed process control system.

7. The apparatus of claim 1, wherein the configuration application, when executed, creates the further module to be executed within one of the field devices communicatively connected to the distributed controller during the operation of the distributed process control system.

8. The apparatus of claim 1, further including a simulation application stored in the memory of the computer which, when executed on the processing unit of the computer communicates with the controller application within the computer to simulate the operation of the distributed process control system.

9. The apparatus of claim 1, wherein the controller application, when executed within the distributed controller, communicates with the field devices through an input/output device.

10. The apparatus of claim 1, wherein the controller application, when executed on the computer, communicates with a further controller that is of a different type than the distributed controller of the distributed process control system.

11. The apparatus of claim 10, further including a viewing application stored in the memory of the computer which, when executed on the processing unit of the computer communicates with the controller application and uses a user interface to display information sent from the further controller.

12. A method of simulating a distributed process control system having a user workstation remotely located from a distributed controller which controls one or more field devices using control modules, wherein the user workstation stores and uses a configuration application used to create the control modules for execution by the distributed controller to communicate with at least one further module within a device separated from the distributed controller and wherein the distributed controller stores and executes a controller application to control a process using the control modules during operation of the distributed process control system, the method comprising the steps of:

storing the configuration application in a first computer having a memory and a processing unit;

storing the controller application in the memory of the first computer;

executing the configuration application on the first computer to create a first control module to be used by the distributed controller within the distributed process control system to communicate with the at least one further module and to create the at least one further module to be used by a device apart from the distributed controller within the distributed process control system; and executing the controller application on the first computer to cause execution of the first control module and the at least one further module within the first computer to thereby simulate operation of the distributed process control system.

13. The method of claim 12, further including executing the configuration application to create a user interface for use in displaying information to a user, storing a viewing application in the memory of the first computer and executing the viewing application on the first computer to display information pertaining to the first control module to a user on a display associated with the first computer using the user interface.

14. The method of claim 12, further including storing a configuration database application in the memory of the first computer and executing the configuration database application on the first computer so that the configuration database application communicates with the controller application within the first computer to manage a configuration database.

15. The method of claim 12, wherein executing the controller application includes specifying an execution rate for the first control module when executing the first control module within the first computer.

16. The method of claim 15, wherein executing the controller application includes executing the first control module at an execution rate that is greater than or less than a real time execution rate of the first control module when the first control module is executed within the distributed controller of the distributed process control system.

17. The method of claim 12, wherein executing the configuration application includes creating the at least one further module to be executed within one of the field devices communicatively connected to the distributed controller during the operation of the distributed process control system.

18. The method of claim 12, further including storing a simulation application in the memory of the first computer and executing the simulation application on the first computer to communicate with the controller application within the first computer to simulate the operation of the distributed process control system.

19. An apparatus for use in conjunction with a distributed process control system having a user workstation remotely located from a distributed controller that controls one or more field devices using control modules, the apparatus comprising:

a computer having a memory and a processing unit;

a display connected to the computer;

a controller application stored in the memory of the computer, wherein the controller application, when executed on the distributed controller, implements a control module during operation of the distributed process control system and wherein the controller application when executed on the computer communicates with a further controller that uses a different communication protocol than the distributed controller of the distributed process control system; and a viewing application stored in the memory of the computer which, when executed on the processing unit of the computer communicates with the controller application and uses the display to display information sent from the further controller.

20. The apparatus of claim 19, further including an interface connected between the further controller and the controller application.

21. The apparatus of claim 20, wherein the interface is an OPC interface.

* * * * *

UNITED STATES PATENT AND TRADEMARK OFFICE
CERTIFICATE OF CORRECTION

PATENT NO.         : 7,257,523 B1
APPLICATION NO.    : 09/510053
DATED              : August 14, 2007
INVENTOR(S)        : Mark J. Nixon et al.

It is certified that error appears in the above-identified patent and that said Letters Patent is hereby corrected as shown below:

On the Title Page

Item (56), Other Publications, first reference, "fieldbs" should be -- fieldbus --.

Signed and Sealed this

Ninth Day of September, 2008

JON W. DUDAS
*Director of the United States Patent and Trademark Office*